United States Patent [19]
Kuehnle

[11] Patent Number: 5,784,923
[45] Date of Patent: Jul. 28, 1998

[54] TOROIDAL DRIVE SYSTEM AND METHOD OF ASSEMBLING SAME

[76] Inventor: Manfred R. Kuehnle, Waldesruh Route 103 A P.O. Box 1020, New London, N.H. 03257

[21] Appl. No.: 711,975

[22] Filed: Sep. 10, 1996

[51] Int. Cl.⁶ .................................................. F16H 55/32
[52] U.S. Cl. ...................... 74/465; 74/424.8 C; 475/345; 475/347
[58] Field of Search ...................... 475/183, 331, 475/345, 347, 904; 74/409, 424.8 C, 465

[56] References Cited

U.S. PATENT DOCUMENTS

| Re. 26,476 | 10/1968 | M.R. Kuehnle . | |
|---|---|---|---|
| 3,174,354 | 3/1965 | Kuehnle . | |
| 4,297,919 | 11/1981 | Kuehnle . | |
| 5,435,794 | 7/1995 | Mori et al. ............................ | 475/343 |

*Primary Examiner*—Khoi Q. Ta
*Attorney, Agent, or Firm*—Cesari and McKenna, LLP

[57] ABSTRACT

A toroidal drive system includes a housing composed of first and second mating housing sections having interior walls which cooperate to define a plurality of parallel, helix-like races inscribed in a torus having a circular axis. The two mating housing sections are secured together and a plurality of rotary elements are fixedly spaced apart along that axis, the elements each having an axle fixed at the axis and a plurality of removable, radially extending teeth rotatably encircling the corresponding axle, each tooth of each rotary element engaging in a different one of the plurality of races. A worm is mounted for rotation in the housing about an axis substantially perpendicular to the circular axis, that worm engaging at least one tooth of each of the plurality of rotary elements. Power take off means are connected to all of the axles and extend without the housing. Access holes are provided in the housing section walls at the bottoms of the races, the holes being larger than the teeth engaged in the races so that the housing sections can be mated around the rotary elements while the elements are missing some teeth and secured together after which the missing teeth may be installed on the rotary elements through the access holes by rotating the worm to align the missing tooth positions of the elements with the holes. Methods of making and assembling the drive system are also disclosed.

39 Claims, 9 Drawing Sheets

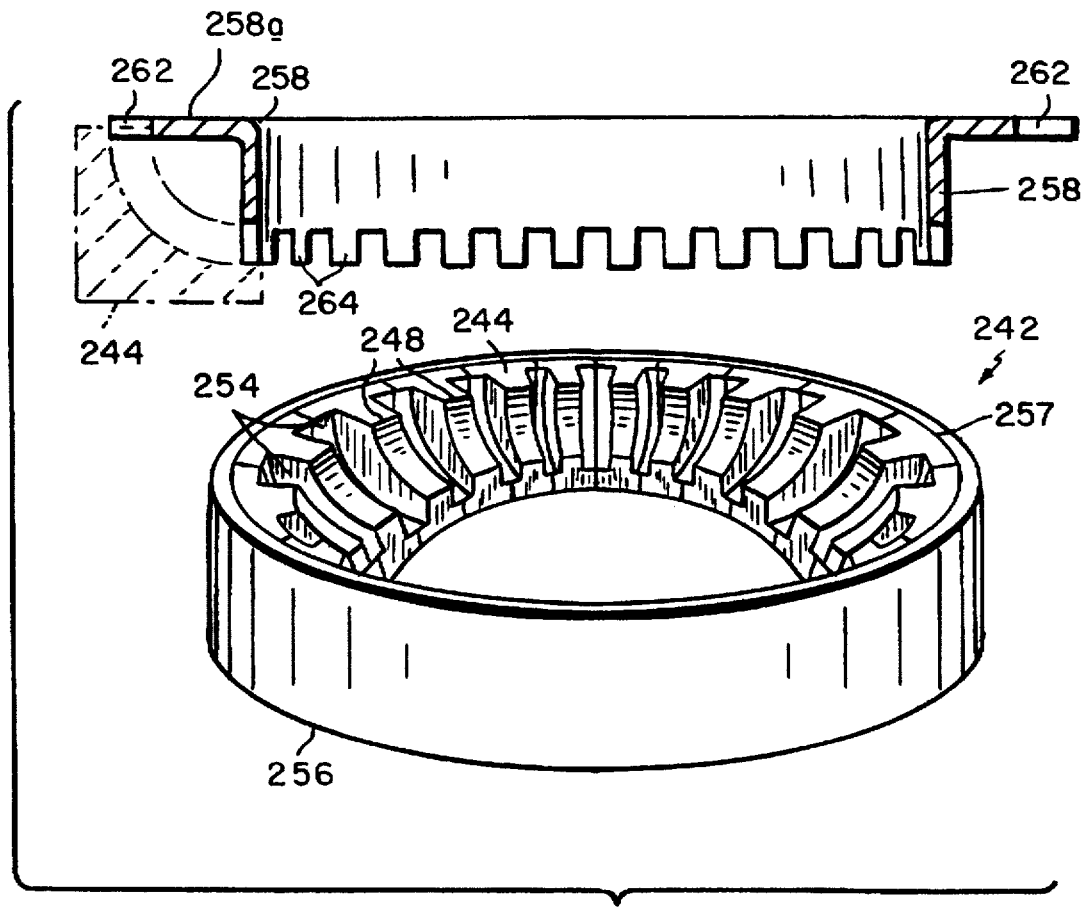
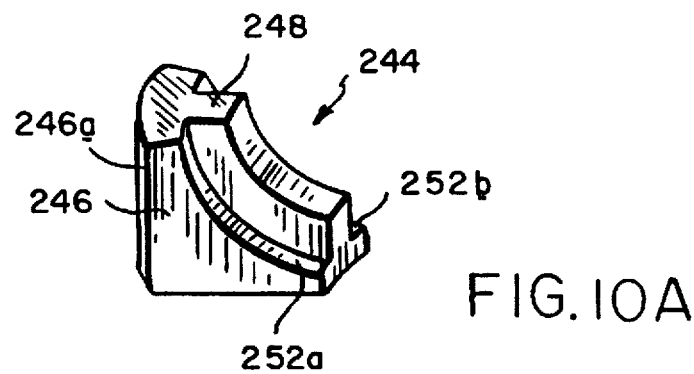
FIG. 10
FIG. 10A

TOROIDAL DRIVE SYSTEM AND METHOD OF ASSEMBLING SAME

This invention relates to a toroidal drive system and to methods of making and assembling the system. It relates more particularly to a unique type of mechanical power transmission that operates within a very compact space envelope by causing a radially positioned group of load sharing rotor elements, when driven by a central drive worm, to rotate and precess along a multiplicity of guide grooves that are contained in a stator housing with said grooves forming collectively a geometric torus.

This power transmission can be driven from either side to function either as a speed reducer or speed increaser with equal efficiency. With its coaxial configuration, this transmission is uniquely suited for handling high torque requirements in confined spaces where minimum weight, minimum volume, and low acoustic noise are of premium value. The applications that can be addressed with this transmission are, for example, helicopter rotors, automotive wheel drives, actuators in earth moving heavy equipment, industrial drives, tank sprocket drives, and precision positioning devices.

BACKGROUND OF THE INVENTION

Over the years, I have developed several power transmissions which incorporate the kinematic principles of the toroidal drive. Those early transmissions, are described in detail in U.S. Pat. Nos. 4,297,919 and RE 26,476, among others. Those early efforts were aimed at building highly compact mechanisms whose motion and power transmission capabilities depended, at least theoretically, on the employment of multiple, load-sharing, rotary bearing elements to transmit high torque at high reduction ratios. The fruits of those efforts were relatively compact, lightweight, high-efficiency gear reducers whose additional attributes were high-resistance against shock and geometric coaxiality between input and output.

However, when attempts were made to implement the theoretically possible load sharing abilities and to build those devices in quantity, certain serious limitations appeared such as the impossibility to assemble a full complement of rotors and the high cost and difficulty in manufacturing some of the elements, severe restrictions with regard to the number of load-sharing bearing elements that could actually be employed in a given transmission and to handle large loads on the output shelf. There was an equally serious limitation regarding the practical range of speed ratios that could be achieved between the transmission input and output. More particularly, only transmissions with gear ratios of 36:1 or more could be made as a practical matter.

A transmission of the type described in the first above patent is depicted in FIG. 1. The load-sharing elements in this type of transmission comprise rotor units 10 each of which includes a hub 12, a ring 14 rotatably mounted coaxially to the hub and a plurality of fingers 16 extending radially outward from the ring, the fingers being terminated by rollers 18. The rotors 10 are mounted via the hubs 12 to a large ring 20 centered on the rotary axis of the transmission input and output shafts 22 and 24, respectively. The rollers 18 of radially inner fingers 16 of the bearing units engage in the grooves of a worm 26 connected to the input shaft 22 and the ring 20 to which the bearing units 10 are mounted is connected by arms 28 to the output shaft 24.

The outer fingers 16 of the rotor units 10 engage in grooves or races 32 inscribed in the interior of a two-section transmission housing 34. When the drive worm 26 is rotated by the input shaft 22, the various rotor units 10 are caused to rotate about their respective hubs 12. Since the rotors also engage in the housing races 32, rotation of those rotors causes the rotors to advance along the races which, in turn, causes the ring 20 to which the rotor units are attached to precess about the rotary axis of the transmission. Since the ring 20 is connected to the output shaft by arms 28, when the ring 20 rotates, so does the output shaft 24.

FIG. 1 depicts a transmission having six planetary rotor units each of which has six rolling fingers 16. However, it has become obvious that smaller gear ratio transmissions with the toroidal races 32 having generally rectangular cross sections as shown simply cannot be assembled on a production basis with more than three fingers on each rotor unit 10 because of the three-dimensional nature and spatially twisted geometry of the toroidal races 32 that have to be engaged by the rotor units 10.

More particularly, when assembling the transmission, the rollers 18 on the radially inner fingers 16 of all of the rotor units 10 must engage the threads of the drive worm 26 and the rollers of the radially outer fingers of the rotor units must simultaneously engage in the helical races 32 inscribed in the stator housing 34. Since the rotor units are more or less flat and the races 32 are spatially twisted or skewed at relatively steep angles, it has proven to be very difficult to locate all of the rotor unit fingers in their respective worm threads and races all at the same time to enable the upper and lower sections of housing 34 to be brought together so as to envelop the rotor units, especially when the transmission incorporates rotor units with more than four rolling fingers and/or more than three rotor units in toto.

In other words, the crossover angle between the rotational plane of the rotor unit and associated helical race has to be quite large leading to a twisted race geometry into which the multiple rotor unit fingers cannot be inserted during assembly of the device due to that twist. For example, the FIG. 1 transmission having a double-threaded worm 26 and six rotor units 10 each having six fingers 16 has a gear ratio of 12:1 and the rotor units rotate four times for each revolution of the output shaft 24. The helical races 32 of this 12:1 design possess such steep lead angles that the drive rollers 18 on all of the planar rotor units simply cannot be inserted into the races during assembly of the transmission due to mechanical obstructions.

Thus, due to the aforementioned assembling difficulties, until now there has been no solution to extending the number of rotor units 10 and/or the number of rolling fingers on each rotor unit to build toroidal drives with lower gear ratios and steeper races and, equally important, with the theoretically possible number of rotor elements to achieve the desired torque capability. Thus, the practical gear ratio restriction imposed on prior toroidal transmissions has limited their field of use as a torque-capable transmission and the sought after advantages of such transmissions, e.g., low gear reduction and the theoretically possible high torque transmission, have not been realized.

SUMMARY OF THE INVENTION

Accordingly, the present invention aims to provide a toroidal drive system which may have a gear ratio within a wide range, e.g., 12:1 to 100:1 combined with high torque capability, yet which is relatively easy to make and to assemble.

Another object of the invention is to provide a drive system of this type which is many times lighter in weight and much more compact than classical transmissions.

Still another object is to provide a toroidal drive system which produces substantially less vibration and acoustic noise when in operation than classical transmissions.

A further object of the invention is to provide a toroidal drive system which may incorporate an integral motive source so that the system can be used as a compact efficient, integrated power source for individual rotary shafts, wheels, rotary joints and the like.

Another object is to provide a transmission in which the high speed input shaft runs inside the output shaft with a number of rotary planetary members extending outward through slits in the output shaft to engage in guide grooves in a torus-shaped housing.

Another object of the invention is to provide a toroidal drive system which can incorporate a maximum number of load-sharing elements so that the system can couple very high torque between its input and output shafts at a specified gear reduction ratio.

Yet another object of the invention is to provide a method of assembling a toroidal transmission of the type having more than three load sharing rotor elements.

A further object is to provide for the tandem coupling of two or more of such toroidal transmissions to engage with a common drive element such as a rotor star wheel at the bottom of a helicopter main rotor shaft.

Another object is to provide a method of making a toroidal drive stator containing a multiplicity of toroidal races out of individual spatially curved segments that are secured together.

Other objects will, in part, be obvious and will, in part, appear hereinafter. The invention accordingly comprises the several steps and the relation of one or more of such steps with respect to each of the others, and the apparatus embodying the features of construction, combination of elements and arrangement of parts which are adapted to effect such steps, all is exemplified in the following detailed description, and the scope of the invention will be indicated in the claims.

Briefly, my toroidal drive system comprises a stator housing having a wall defining a plurality of generally parallel, helix-like guide grooves or races inscribed into a torus having a closed, ring-shaped circular axis. A plurality of axles that are fixedly spaced-apart and mounted as part of a central, fully extended, high torque output shaft located centrally in the housing hold a plurality of rotary elements or rotors that are rotatably mounted to the axles. Those rotors have removable and replaceable rolling teeth, each tooth of each rotor being in engagement with a different one of the guide grooves. A low torque input shaft extends into the output shaft perpendicular to the circular torus axis and has a worm gear, usually of split design, centered between the rotor elements and meshing with all the adjacent teeth of the contiguous rotor elements. The high torque output shaft extends from the top of the housing coaxially enveloping the input shaft that is contained within all the way down through the housing bottom to provide external connectability. Accurately located access holes are provided in the upper and lower housing sections at the bottoms of a predetermined number of the guide grooves, those holes being larger than the rolling teeth so as to permit the placement of the teeth on the rotor elements from outside the assembled housing.

The toroidal drive is assembled by forming a housing composed of first and second mating housing sections having interior walls which cooperate to define a plurality of generally parallel, helix-like races inscribed in a torus having a circular center axis. Precisely located access holes are formed in the wall of both housing sections to gain access to those grooves that correspond to the number of rolling teeth that populate all the rotor elements. With the two housing sections apart, the full complement of rotor elements is mounted to the output shaft that already contains the input shaft and central worm. The rotor elements are positioned in slits formed at fixedly spaced apart radial locations in the output shaft about the torus axis. Each rotor element has one or two rolling teeth engaged with the central worm. However, the external or radially outer locations of the rotor elements are not yet equipped with rolling teeth as to enable the output/input shaft assembly to be mounted into the lower housing section while the rotor elements and the worm are prevented from rotating. At this point, the missing lower teeth for the rotor elements can be mounted through the access holes in the lower housing section and fastened to the rotor elements. Thereafter, the upper housing section may be placed onto the assembly so as to engage with the lower housing section. The missing upper rolling teeth for the rotor elements may then be inserted through the access holes in the upper section and fastened onto the rotor elements. The central worm is then rotated by rotating the input shaft to position along the races opposite the access holes any remaining rotors not yet furnished with their full complements of rolling teeth so that the missing teeth may be installed on those rotors from the outside after the two housing sections are assembled.

This procedure may be applied in reverse in case the toroidal transmission needs to be disassembled or refurbished.

A significant innovation in this novel toroidal transmission is the complete integration of the high speed/low torque input shaft into the inside of the low speed/high torque output shaft. The flow of power thus first enters the interior of the output shaft where it turns at one speed driving the internal worm member. It is only via the rotor elements that engage with the worm and extend through slits located in the tubular wall of the larger diameter output shaft, that the flow of power reaches the exterior space and thus enables the rotor elements to engage and travel along the toroidal guide grooves that are cut into the upper and lower housing sections constituting the transmission's stator.

Thus, a standard input/output shaft assembly can be used in numerous stator configurations with a wide ranging number of grooves, provided that the radial position angles of the slits in the tubular wall of the output shaft conform to certain mathematical placement requirements between worm lead angles and stator lead angles to be described in detail later.

To our knowledge there exists no prior gear transmission whose input/output shafts are contained one within the other and whose power flow travels to the exterior space via slits in the tubular wall of the output shaft and from there back to said wall via the mounts of the rotor elements and thus to the accessible end of said output shaft.

While it is possible to form the helical grooves in the stator housing by cutting them into a solid ring-like piece of material using either a three dimensional milling machine (see my U.S. Pat. No. 4,460,297) or a seven axis milling machine controlled by appropriate software, it is also possible to assemble the required compendium of grooves by aggregating numerous radial stator segment into a circular configuration as will be described later. The advantage of this approach resides in the ability to inexpensively cast individual stator housing pieces in the required twisted shape and then performing a precision assembly operation that fixes each element accurately in the required position by suitable known fastening techniques. Weight reductions can be achieved by casting the stator segments as hollow shapes. Alternatively, such stator pieces can be forged out of thin steel sheets, welded together on a bottom plate, and then precision ground.

While my toroidal transmission can be placed into strategic power joints or into confined, small spaces to convey large torque forces or effectuate substantial speed changes, it is also possible to devise a configuration, such as for a helicopter transmission, where two toroidal transmissions cooperate to drive a common star wheel that drives the main rotor shaft of the helicopter as will be described later in detail. This type of drive where the output shaft carriers another worm to engage a star wheel is applicable for many other types of machinery whether the drive is employed in tandem or in singular form.

BRIEF DESCRIPTION OF THE DRAWINGS

For a fuller understanding of the nature and objects of the invention, reference should be had to the following detailed description taken in connection with the accompanying drawings, in which:

FIG. 10 is a perspective view of another stator housing section embodiment incorporating my invention; and FIG. 10A is a similar view of a single segment of the FIG. 10 housing section.

DESCRIPTION OF THE PREFERRED EMBODIMENTS

Figure 1:
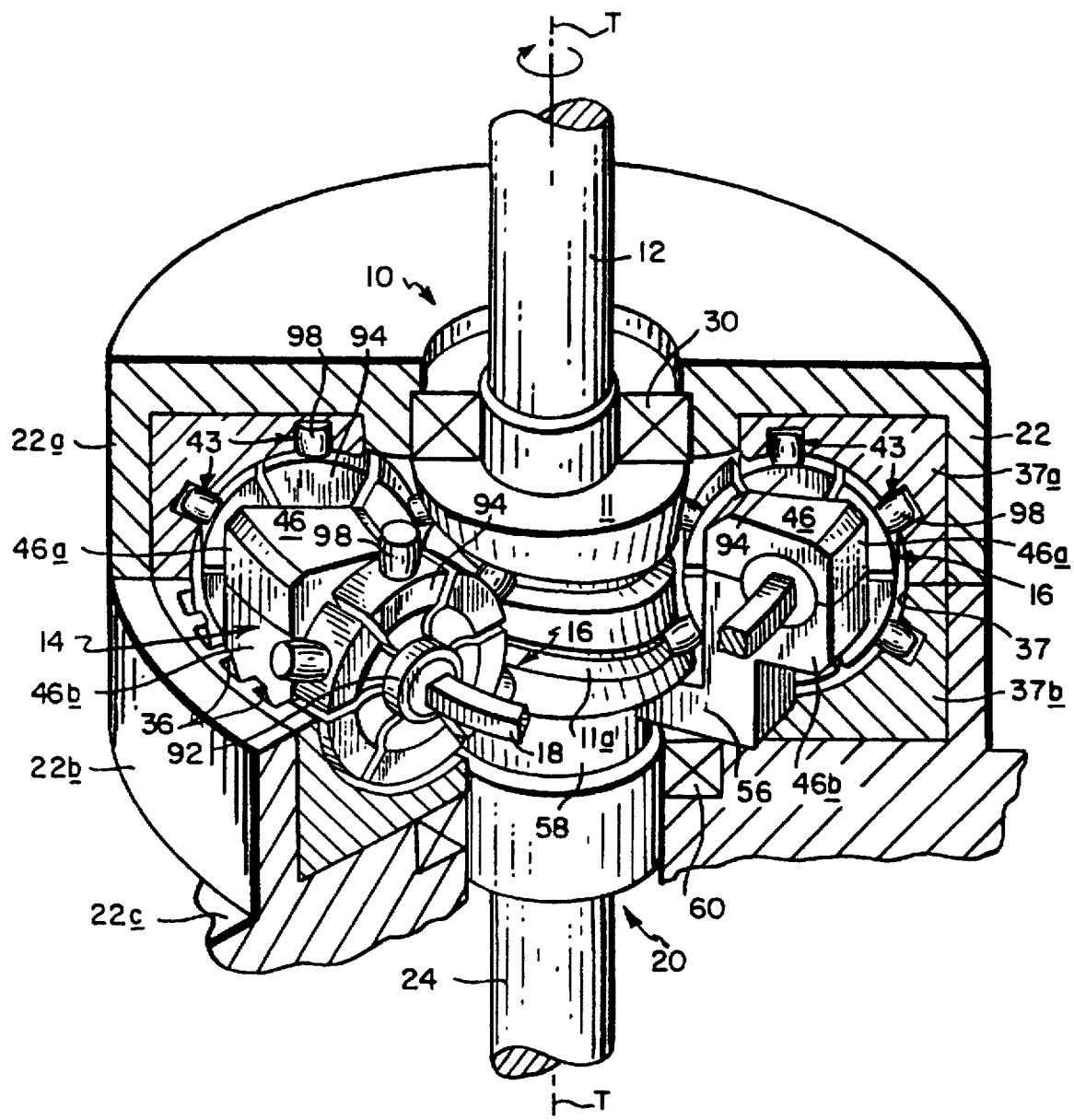
FIG. 1, already described, is a perspective view partially broken away of a conventional toroidal power transmission.
Figure 2:
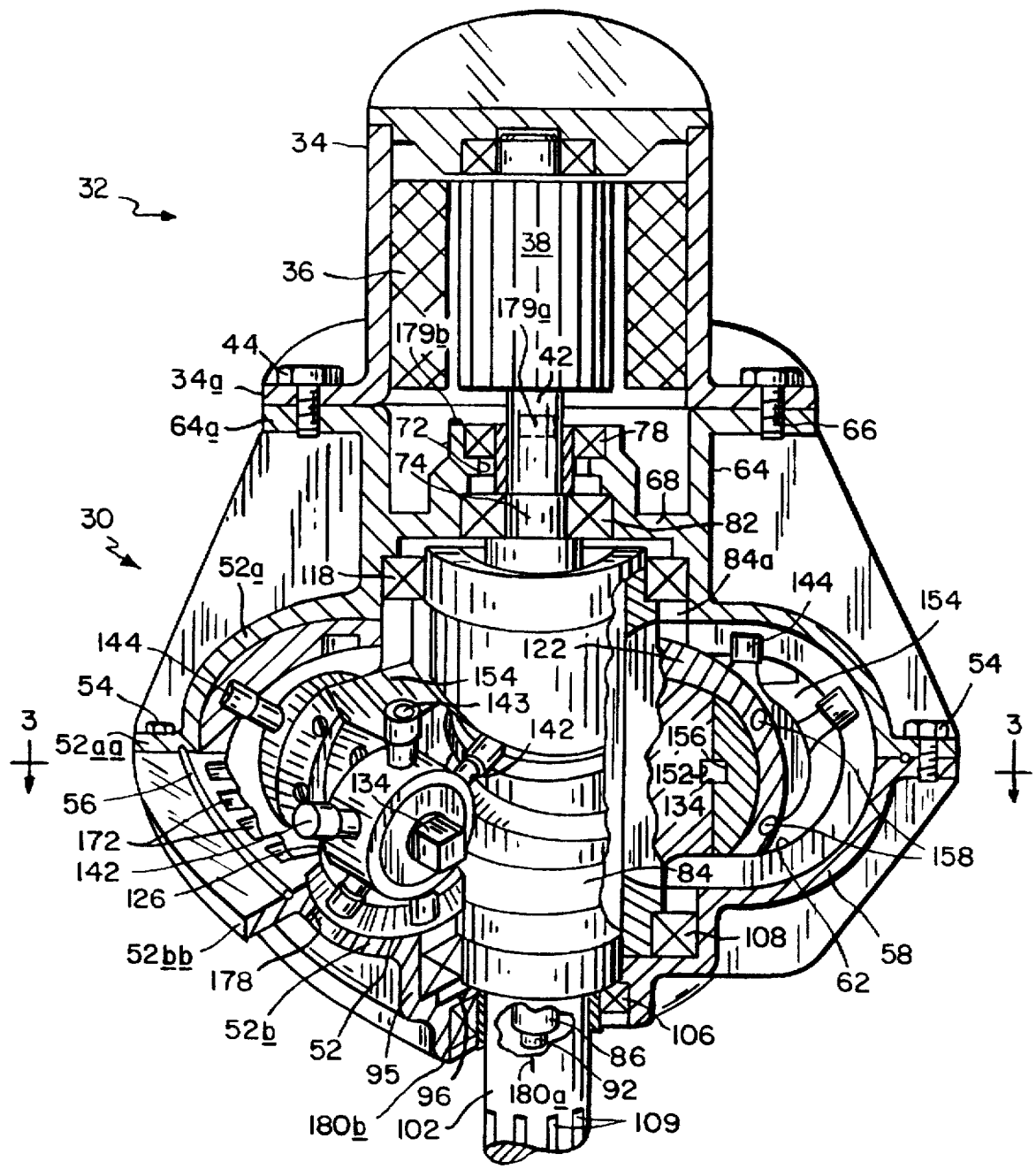
FIG. 2 is a similar view of a toroidal drive system incorporating the invention.

Referring to FIG. 2 of the drawings, my toroidal drive system comprises a torodial transmission shown generally at 30 coupled to an integral motive source indicated generally at 32. While the motive source 32 could be a jet engine, gasoline engine or other such prime mover, the one specifically illustrated is an electric induction motor. It includes housing 34 which encloses a conventional stator 36 which surrounds a rotor 38. An output shaft 42 is connected to rotor 38 and extends from housing 34 so that when electric current is applied to the motor, rotor 38 and shaft 42 are caused to rotate. The motor housing 34 has a circumferential flange 34a which may be coupled by bolts 44 to transmission 30 so that the motor shaft 42 can be used to drive the transmission 30 to be described presently.

Figure 3:
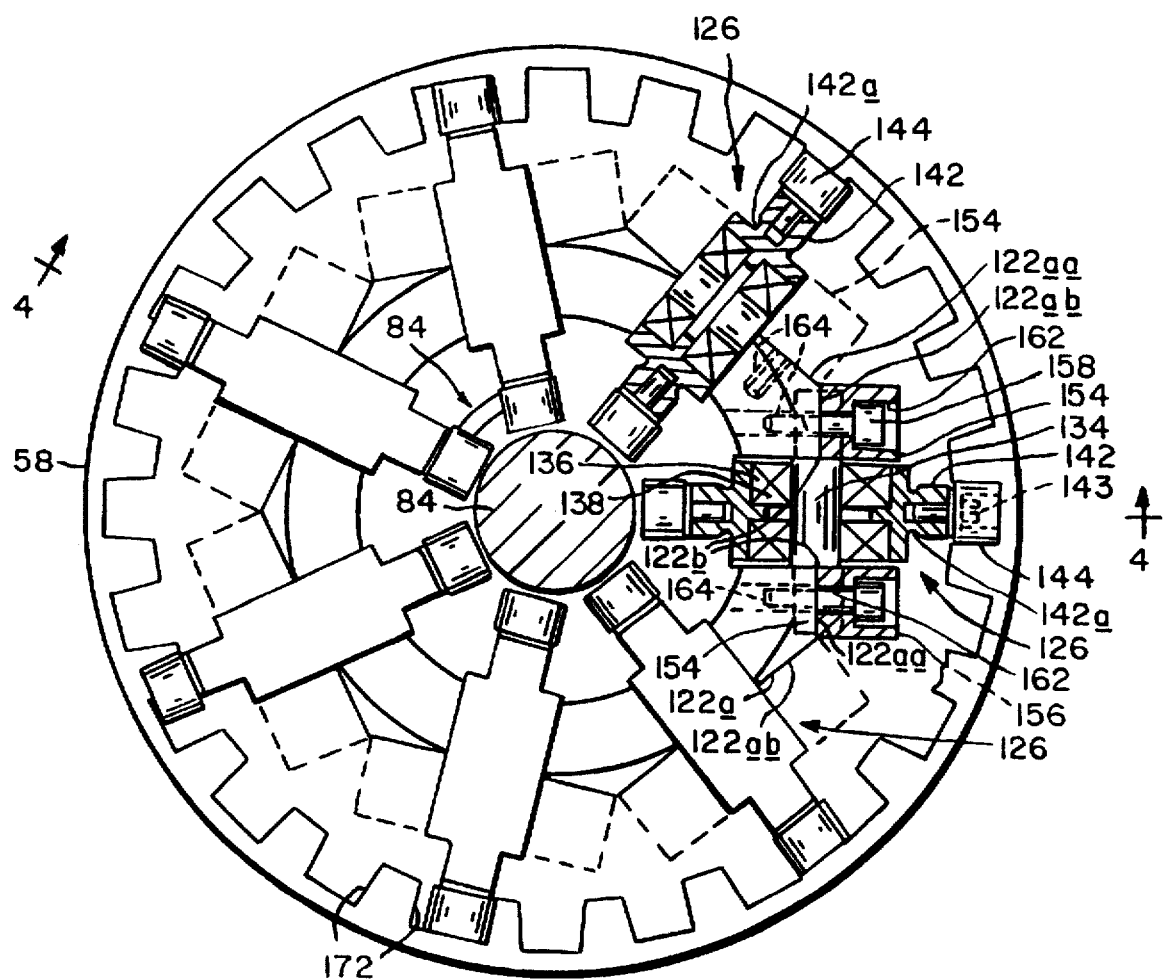
FIG. 3 is a sectional view taken along line 3—3 of FIG. 2.
Figure 4:
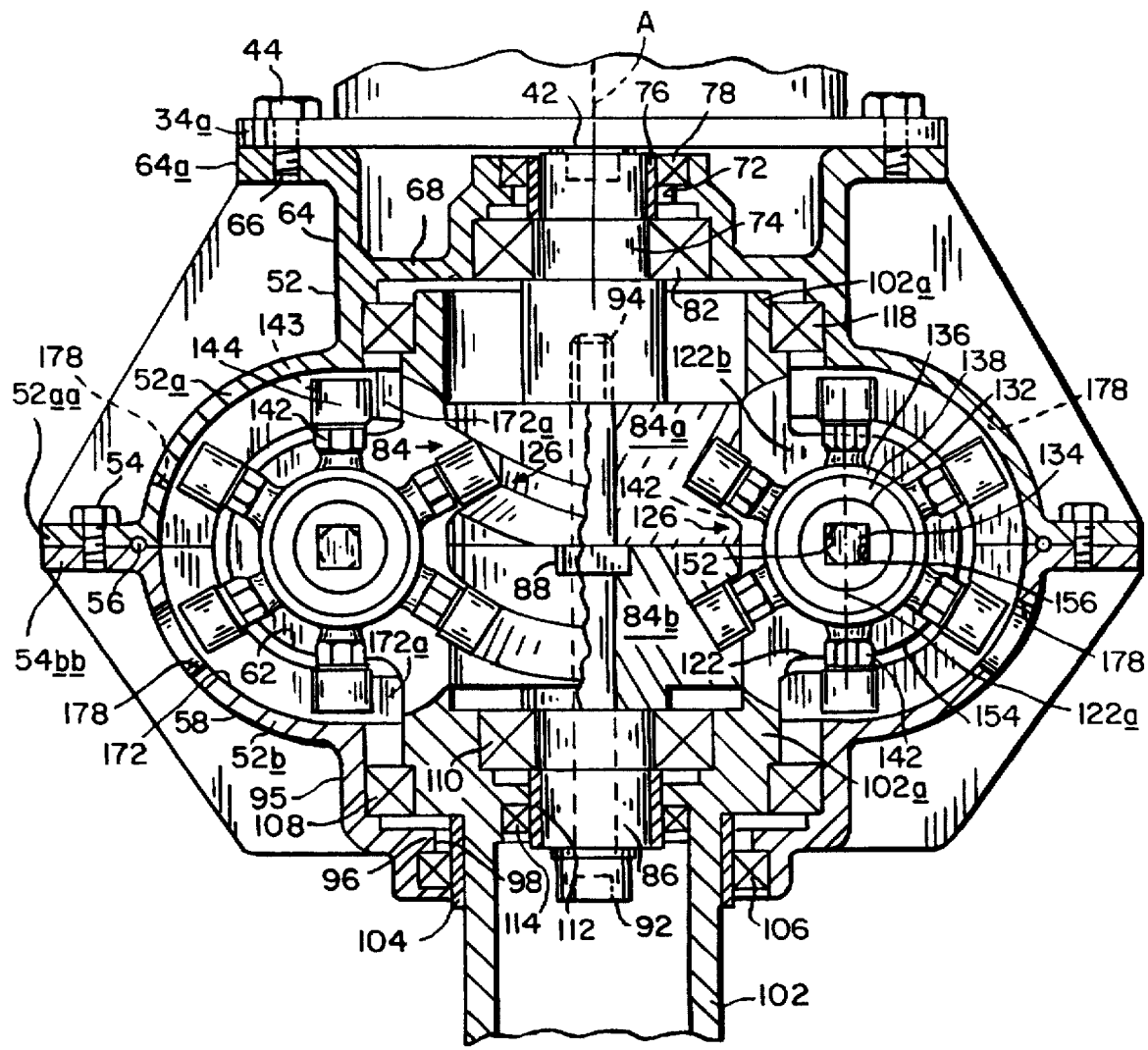
FIG. 4 is a sectional view taken along line 4—4 of FIG. 3.

Referring now to FIGS. 2 to 4, transmission 30 includes a stator housing 52 composed of mating first and second housing sections 52a and 52b. The two housing sections may be secured together at mating peripheral flanges 52aa and 52bb by a series of bolts 54 distributed around the flanges. Each bolt 54 extends through an opening in flange 52aa and is turned down into a threaded passage in flange 52bb. Preferably, the opposing surfaces of the two flanges each contain a circumferential groove for accommodating an O-ring 56 so that when the two sections are secured together by bolts 54, there is a fluid-tight seal between them.

Housing 52 is generally cylindrical and therefore symmetric about its longitudinal axis A. However, it does have a radially outwardly rounded bulging mid portion 58 which extends all around the housing so as to define a toroidal cavity 62 inside the housing which has a semicircular crossection. Extending up from housing portion 58 is a cylindrical neck portion 64 whose upper end is terminated by a radial flange 64a which is arranged to engage flange 34a of the motor housing 34. Flange 64a is provided with a series of threaded openings 66 for receiving the threaded fasteners 44 that secure the motor housing 34 to the transmission 30.

Neck portion 64 of housing 52 has an annular top wall 68 whose central opening 72 accommodates the transmission's input shaft 74. As best seen in FIG. 4, shaft 74 is provided with a bushing 76 and the top wall 68 and shaft 74 are stepped to accommodate suitable cone bearing units 78 and 82, with internal oil lubrication if needed, in order to rotatably mount shaft 74 to housing 52 and to absorb thrust imposed on the shaft during operation of the transmission 30.

The upper end of shaft 74 is shaped to interfit or key with the lower end of the motor shaft 42 so that when the motor 32 and transmission 30 are connected together by bolts 44, the two shafts are rotatably coupled so that the torque produced by motor 32 is coupled to the input shaft 74 of the transmission 30.

Figure 5:
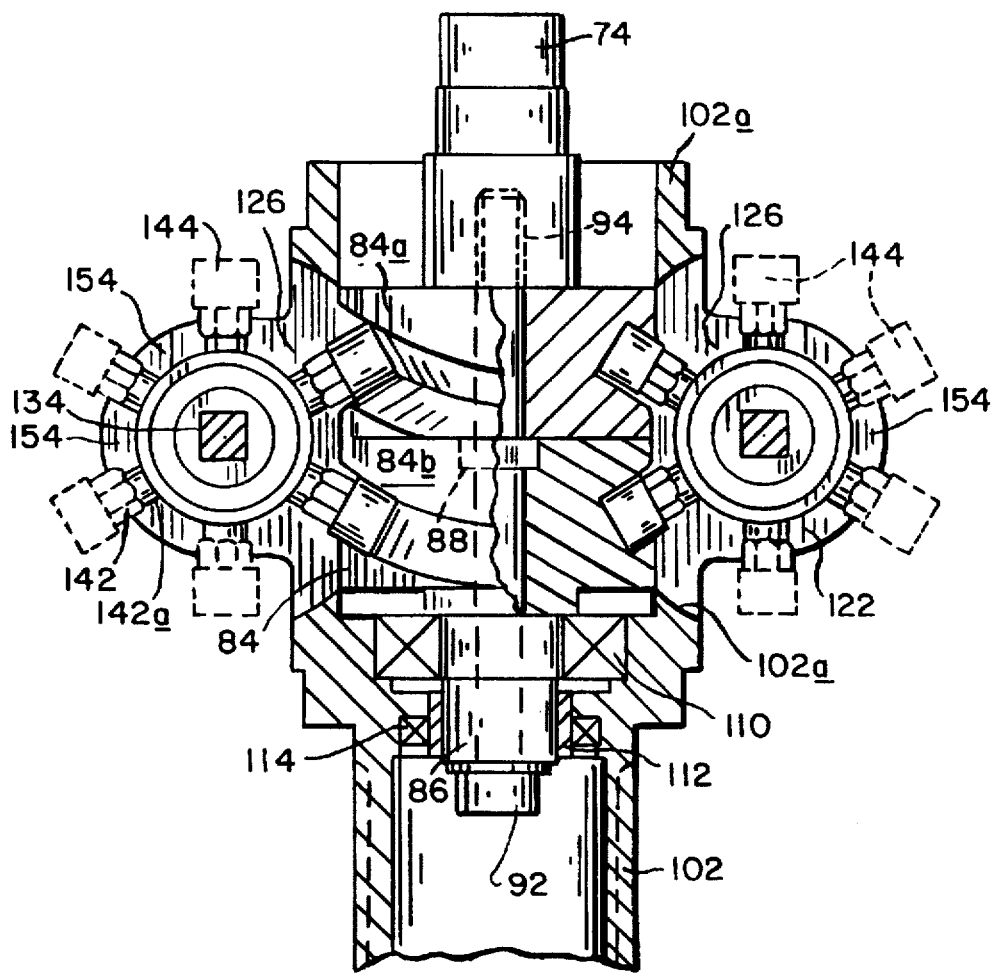
FIG. 5 is a view similar to FIG. 4 showing the drive's integrated input/output shaft assembly separate from the stator housing.

As best seen in FIGS. 2, 4 and 5, input shaft 74 carries an hour glass-shaped, double-threaded central worm gear 84 which is centered on axis A opposite the toroidal cavity 62 inside housing 52. The worm gear 84 is preferably composed of separable upper and lower sections 84a and 84b. Section 84a is affixed to or integral with the lower end of shaft 74. The lower section 84b is connected to or integral with a depending cylindrical stub shaft 86. The abutting surfaces of the two gear sections 84a and 84b are keyed together as shown at 88 so that the two sections rotate in unison. The two sections are held together by a long bolt 92 that extends through axial passages in the stub shaft 86, worm gear sections 84b and 84a and is screwed into a threaded passage 94 in the lower end of shaft 74 as shown in FIGS. 4 and 5.

Housing 52 is provided with a cylindrical segment 95 which extends down from bulging portion 58 and is partially closed by an annular bottom wall 96 having a central opening 98 for accommodating an output shaft 102 for the transmission. Shaft 102 is provided with a bushing 104 and the housing bottom wall 96 is stepped to allow the seating of appropriate lubricated cone bearing units 106 and 108 to enable output shaft 102 to rotate relative to housing 52 and to absorb the thrust imposed on that shaft. Preferably, one or more splines 109 (FIG. 2) is provided on shaft 102 to facilitate rotatably coupling that shaft to a load.

As best seen in FIGS. 4 and 5, shaft 102 is hollow or tubular and the shaft portion 102a just above the housing bottom wall 96 is enlarged and counterbored to accommodate a bearing unit 110 which encircles the stub shaft 86. The stub shaft is also surrounded by a bushing 112 just below bearing unit 110 and another bearing unit 114 is provided between output shaft 102 and the bushing so that the stub shaft 86, and therefore the worm gear 84, are rotatably supported by and within output shaft 102. In other words, while the output shaft 102 can rotate relative to housing 52, the input shaft 74 and worm gear 84 can rotate relative to housing 52 as well as to output shaft 102.

As shown in FIGS. 2 to 4, the enlarged output shaft 102a extends up within housing 52 to a point just below the housing top wall 68 and that upper end is centered on the housing axis A by a bearing unit 118 seated within the housing neck portion 64. Formed on shaft 102 directly between housing cavity 62 and worm gear 84 is a circular distribution of radially extending ears 122 which project radially into the cavity 62, the ears being separated by radial slits. The radially outer faces 122a of ears 122 are flat and extend parallel to axis A as shown in FIG. 4. Actually, as seen from FIG. 3, the radially outer surface 122a of each ear 122 has two facets 122aa and 122ab, each facet being parallel to axis A for reasons to be described. Also, the opposing side surfaces 122b of adjacent ears 122 defining the slits are flat and parallel to one another as well as to axis A as best seen in FIG. 3.

The ears 122 of output shaft 102 are designed to support a plurality of load-sharing rotary elements or rotors shown generally at 126 which fit into the slits, there being one rotor 126 located in the slit between each pair of adjacent ears 122.

Each rotor 126 comprises a hub 132 which encircles an axle 134 having squared off ends which project from opposite ends of the hub. Concentric to hub 132 is a radially outer shell or ring 136 which is separated from the hub by bearings 138 so that the shell is free to rotate relative to hub 132 and axle 134. Formed integrally with shell 136 is a circular array of radially extending fingers or teeth 142 which are equally spaced apart around the perimeter of shell 136. Preferably, each finger 142 has a necked down segment 142a (FIG. 3) at the root of each finger to enable each finger to flex to some extent relative to the associated shell 136. Rotatably mounted to the outer end of each finger 142 by a threaded fastener 143 is a drive roller 144 which can rotate about the longitudinal axis of the associated finger. Rollers 144 may be needle bearings or sleeve bearings. In the latter event, the bearings are internally lubricated in a conventional manner to minimize rolling friction.

The illustrated rotary elements 126 each have six fingers. However, more or fewer fingers may be used depending upon the gear ratio desired for the particular transmission as described in my U.S. Pat. No. 4,297,919.

The rotors 126 are positioned in the radial slits between adjacent ears 122 such that the opposite square ends of each rotor axle 134 seat in lateral channels 152 formed in the coplanar outer wall facets 122aa, 122ab of adjacent ears 122. In other words, a lateral channel 152 is formed in each facet 122aa and 122ab of each ear 122 to help support the axles of two adjacent rotor elements 126. The rotor axles 134 are clamped to their respective ears 122 by brackets 154 which are arranged to seat against the radially outer surfaces 122a of ears 122 as shown in FIGS. 3 and 4. Each bracket 154 is formed with a laterally extending groove 156 similar to groove 152 for snugly receiving the axle 134 end of the associated rotor 126. Each bracket 154 is secured to the associated ear 122 by a pair of threaded fasteners 158 which extend through countersunk holes 162 in the bracket and are turned down into threaded passages 164 in the associated ear 122.

While the illustrated brackets 154 are each shown as capturing the axle of one rotor, it is obvious that adjacent brackets 154 can be formed as a unit so that each such unit captures the axles of two adjacent rotors.

As shown in FIGS. 3 and 4, the drive rollers 144 of each rotors that face inward toward worm gear 84 interfit therewith so that rotation of the worm gear in one direction or the other about axis A causes rotation of the rotors 126 in unison in one direction or the other about their respective axles 134. On the other hand, the rotor drive rollers 144 located within the toroidal housing cavity 62 are arranged to roll in an array of parallel, helix-like grooves or races 172 inscribed, e.g., by milling, in the toroidal inner wall of the housing bulging portion 58. The races form a multiple thread system which is interrupted to accommodate the output shaft portion 102a and the rotor 126 which it supports. Thus, the races 172 turn back on themselves to form continuous paths for the rotor drive rollers 144, with the rollers of each rotor rolling along in a different one of the races 172. Preferably, the radially inner ends or interruptions of the races are widened or flared at 172a; see FIG. 4. This minimizes noise as the drive rollers 144 enter and leave the race segments during operation of the transmission as described above.

Thus, when the rotary elements 126 are rotated in unison by worm gear 84, the rotors will also revolve or precess in unison about axis A carrying with them the output shaft 102 to which they are attached by ears 122.

As eluded to previously and as best seen in FIG. 5, the output shaft 102 is configured as a tube having a fairly large diameter upper end portion 102a in which is rotatably supported the drive worm 84 that represents the high speed input of the transmission as an internal element to the output shaft, with both shafts rotating simultaneously at substantially different speeds. As best seen in FIG. 4, the output shaft 102a extends up past the bearing 118 so that it completely envelops almost the entire input shaft. This type of "drive element within a driven element" is totally unprecedented in the power transmission field, particularly since the force flow in transmission 30 usually begins at the powered inside worm 84 and then moves radially outward via the rotors 126 through the radial slits between the ears 122 into the helical outer races 172 and from there back to the inside of the transmission where the force then flows, greatly magnified in terms of torque, out through the output shaft 102.

To achieve the desired gear reduction ratio, shaft 102 supports a selected number of rotary elements or rotors 126 at certain strategic points about the transmission axis A. Conventionally, as described in my U.S. Pat. No. 4,297,919, a toroidal transmission may have six rotors, each of which may have six fingers. In that event, the six rotors would be spaced around the drive worm at angles of 60°. However, because of the necessity for the invention embodiment shown in FIG. 2 to engage as many as 36 rotor drive rollers 144 in both the grooves of the drive worm 84 and the steep lead angle races 172 in housing 58 simultaneously, here, specific arrangements are made to deliberately depart from the usual 60° rotor position angle discussed above. Instead of using a 60° position angle, the planet gears 126 are located about axis A at lesser position angles which then enables the simultaneous engagement of the rotor drive rollers 144 in the grooves of the worm gear 84 as well as in the races 172 of housing 58.

Figure 6:
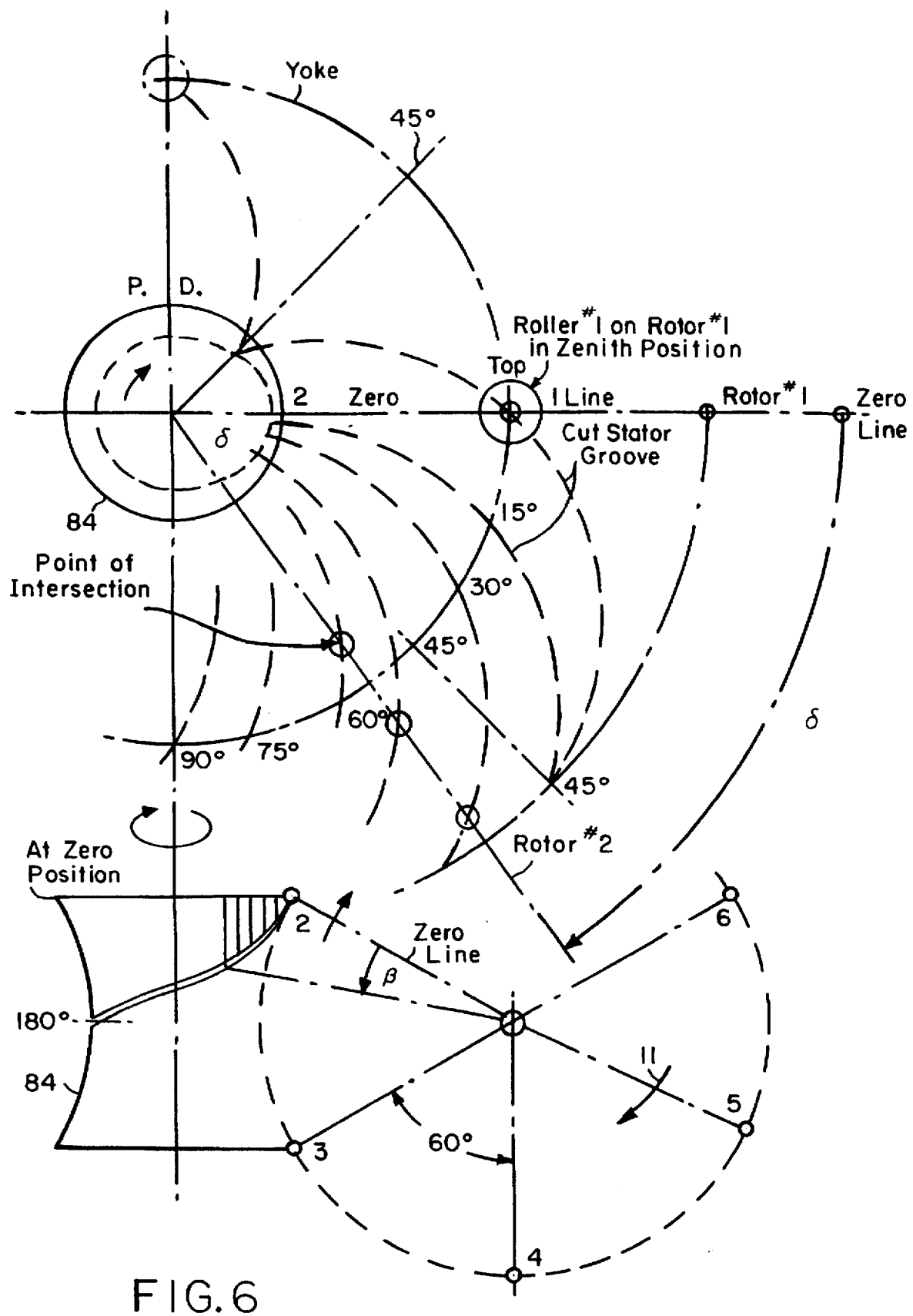
FIG. 6 is a diagrammatic view illustrating the placement of the rotary elements in the transmission shown in FIGS. 2-4.

Refer now to FIG. 6 which illustrates the positioning of the rotary elements or rotors 126 in a six element transmission. In that figure:

α=angle between rotors,

β=rotation of rotor about its own axis, and

γ=rotor placement position about shaft axis, i.e., precession through toroidal cavity At "zero position", rotor #1 engages with its drive roller #1 in stator groove #1 top position. Roller #2 engages the worm at the top entrance to the worm groove. Roller #3 is 60° offset at the bottom exit of the worm groove.

When turning the worm 84 in FIG. 6 clockwise, the worm groove pushes the engaged rollers upwards causing the rotor to rotate clockwise as viewed in that figure.

Now, when rotor #1 is in its "zero position" and rotor #2 needs to be added, then, with its closeness being determined by the diameter of the drive rollers 144, a placement position of approximately 60° from the zero line appears feasible. Yet, even though a stator groove runs through the zenith position at 60°, the rotor cannot engage because the worm groove forces the roller #2 into a 10° (vertical) off-zero position. Accordingly, roller #1 of rotor #2 finds itself unable to engage in the 60° groove (fourth groove). The rotor must therefore be shifted to a position where it can engage both the stator groove(s) and the worm groove, i.e., where rotor placement position γ=worm engagement angle α. Geometrically, there is only one position where γ can equal α.

Iterations

For a single thread worm, a 360° turn of the worm means a 60° rotor finger advance. And, a 60° finger advance causes a 15° precessional advance of the rotor: 6×15=90° because one (1) rotor rotation causes a 90° precessional advance. Obviously, a 90° rotor rotation will cause a 22.5° advance: 4×22.5=90. Now, the following iterations apply if the worm 84 is rotated:

| α. | β. | γ. (Precession) |
|---|---|---|
| 6 × 360° | 360° | 90° |
| 360° | 60° | 15° |

But, if a new rotor (#2) is inserted at 60° while the worm is stationary:

| α₂ | β₂ | 60 − γ₂ = γ | |
|---|---|---|---|
| 60° | | 10° | 60° − 2.5° = 57.5° (mismatch) |
| 59° | α/6 = | 9.833 | 60 − 2.458 = 57.54 |
| 58° | α/6 = | 9.666 | 60 − 2.416 = 57.58 |
| 56° | α/6 = | 9.333 | 60 − 2.333 = 57.66 |
| 55° | α/6 = | 9.166 | 60 − 2.291 = 57.71 |
| 57° | α/6 = | 9.500 | 60 − 2.375 = 57.625 |
| 57.5 | α/6 = | 9.583 | 60 − 2.395 = 57.605 |
| 57.6 | α/6 = | 9.600 | 60 − 2.4 = 57.6 (match) |

Therefore, the rotor #2 position meets the requirement of γ=α so that the interplanetary angular displacement is 57.6°.

Other Reduction Ratios for the Toroidal Drive

Many other reduction ratios are achievable by combining different types of worms (half, single, and double-wrapped grooves) with different types of stators (24, 36, and 48 grooves.) The salient features of these drives are outlined below. The iterations and calculations used are similar to those outlined above, and as such are not included below.

| 1:36 Reduction Ratio Toroidal Drive | |
|---|---|
| Worm type: | Single-wrapped groove |
| | 1:6 ratio rotor to worm |
| Stator type: | 1:6 ratio stator to rotor |
| | 6 × 6 = 36 grooves |
| | 10° angular space between grooves |
| Selected # Rotors: 7 | |

| α | β | 50° − γ (precession) |
|---|---|---|
| 48.65° | 8.11° | 50° − 1.35° = 48.65° |

| 1:48 Reduction Ratio Toroidal Drive (A) | |
|---|---|
| Worm Type: | Double-wrapped groove |
| | 1:12 ratio rotor to worm |
| Stator Type: | 1:4 ratio stator to rotor |
| | 6 × 4 = 24 grooves |
| | 15° angular space between grooves |
| Selected # Rotors: 6 | |

| α | β | 60° − γ (precession) |
|---|---|---|
| 58.78° | 4.90° | 60° − 1.22° = 58.78° |

| 1:48 Reduction Ratio Toroidal Drive (B) | |
|---|---|
| Worm Type: | Single-wrapped groove |
| | 1:6 ratio rotor to worm |
| Stator Type: | 1:8 ratio stator to rotor |
| | 6 × 8 = 48 grooves |
| | 7.5° angular space between grooves |
| Selected # Rotors: 8 | |

| α | β | 45° − γ (precession) |
|---|---|---|
| 44.08° | 7.35° | 45° − 0.92° = 44.08° |

| 1:72 Reduction Ratio Toroidal Drive | |
|---|---|
| Worm Type: | Double-wrapped groove |
| | 1:12 ratio rotor to worm |
| Stator Type: | 1:6 ratio stator to rotor |
| | 6 × 6 = 36 grooves |
| | 10° angular space between grooves |
| Selected # Rotors: 7 | |

| α | β | 50° − γ (precession). |
|---|---|---|
| 49.31° | 4.11° | 50° − 0.69° = 49.31° |

| 1:96 Reduction Ratio Toroidal Drive | |
|---|---|
| Worm Type: | Double-wrapped groove |
| | 1:12 ratio rotor to worm |
| Stator Type: | 1:4 ratio stator to rotor |
| | 6 × 4 = 24 grooves |
| | 15° angular space between grooves |
| Selected # Rotor: 6 | |

| α | β | 60° − γ (precession) |
|---|---|---|
| 58.78° | 4.90° | 60 − 1.22° = 58.78° |

A Formula For Calculating Interplanetary Spacing

Rather than perform time-consuming iterations, it would be helpful to have a simple formula that could be used to calculate the interplanetary spacing. The development of this formula follows below.

To begin, we will define N as any multiple of the angle between stator grooves. For example, in the case of the 1:24 reduction ratio drive, each groove takes up 15° of arc, and, therefore, N is any multiple of 15°.

Also, we will define W as the reduction ratio from worm to rotor and S as the reduction ratio from rotor to stator.

For all toroidal drives, we know that the following relationships hold true:

$N - \gamma = \alpha$ $\alpha / W = \beta$ $\beta / S = \gamma$

From these, the following other relationships can be derived:

$$\alpha/SW = \gamma$$

and by substitution:

$$N - (\alpha/SW) = \alpha$$

which can be rewritten as:

$$\alpha = N[SW/(SW+1)]$$

Of course the product SW is in fact the overall reduction ratio for the drive, and so can be referred to as R $$\alpha = N[R/(R+1)]$$

This formula can be confirmed by comparing to the result obtained using our iterative techniques on a 1:96 ratio drive where N=60° and the worm has a double-wrapped thread. The value attained through iteration is 59.381°. The value obtained from the above formula is:

$$\alpha = 60°(96/97) = 59.3814433°$$

This formula can of course be used to calculate every geometrically acceptable angular spacing between planets. For the 1:96 drive, these angular spacings are:
59.38144°
51.95876°
44.53608°
37.11340°
29.69072°
etc.

It is interesting to note that the difference between each of the above successive values is the same: 7.42268°. Furthermore, because the worm is double-wrapped, there is the opportunity to place planets, rotated down by 30° in order to engage a different portion of the groove, at the intermediate positions between all of the above angles. These angles are:
63.09278°
55.67010°
48.24742°
40.82474°
etc.

Of course this secondary type of interstitial placement is only possible with a double-wrapped worm.

In some large reduction ratio designs, this reduced angular spacing of the rotary elements 126 about axis A enables the insertion of a seventh rotor 126 at a rotational angle of 306°, as shown in FIG. 3, to fill the total available 360° circumference of housing cavity 62. By reducing the angular spacing of the rotors thusly, the torque capability of transmission 30 is increased by approximately 15%, which is a non-expected benefit of critical importance for this compact transmission design. In other words, in some cases, when planning to build a transmission 30 with six rotors 126 each furnished with six fingers 142, one can actually increase the torque capability of that transmission by the addition of a seventh rotor 126 as described above, while also facilitating assembly of the transmission.

Thus, by providing a transmission 30 whose output shaft 102 houses the lower end of the input shaft 74 as shown in FIG. 5 and by inserting an additional rotor 126, there results a transmission with a high torque capability that is unusually small and compact.

Another aspect of the invention resides in the fact that the transmission 30 is designed to allow the easy assembly of a transmission having more than three load-sharing rotary elements 126. More particularly and as shown in FIGS. 2 and 4, access holes 178 are provided at the bottoms of the different races or grooves 172 in both sections of housing 52 for reasons that will be described presently.

To assemble the transmission 30, the input shaft 74 and worm 84 are seated in, and connected to, output shaft 102 by bolt 92. The rotors 126 as then mounted between the ears 122 of the output shaft by the brackets 154 as shown in FIG. 5. However, the rotors are installed with only one or two of the six drive rollers 144 that are normally present on each rotor. These rollers are moved into engagement with the central worm 84 so that the radially outer locations on the rotors are devoid of rollers 144 as shown in phantom in FIG. 5. This allows the input/output shaft assembly to be positioned in the lower housing section 52b while the rotors and worm 84 are prevented from rotating. The next step is to fasten the missing drive rollers 144 to the lower sectors of the rotors 126, i.e., to the fingers 142 that face housing section 52b. This is accomplished by inserting the drive rollers 144 through the access holes 178 in housing section 52b and securing them to their respective fingers 142 by fasteners 143 using a hex wrench or screwdriver.

Next, the upper housing section 52a is mated to the lower section 52b so that it engages over the top of worm 84 and around rotors 126 and the two sections are secured together by fasteners 54.

Then, the missing rollers 144 for the upper sectors of the rotary elements 126 are installed on their respective fingers through the access holes 178 in the upper housing section 52a. Finally, the worm 84 may be rotated to position along the races 172 opposite the access holes 178 any rotors not yet equipped with all of their drive rollers 144, which rollers may be connected to the corresponding rotor fingers 142 through the access holes 178.

To facilitate assembly of the transmission, it is desirable to provide alignment means in the form of bench marks for aligning the input and output shafts about the rotary axis of the device, i.e., phase angle. In FIG. 2, the index marks for the input shaft 74 are shown at 179a and 179b; Those for the output shaft 102 are indicated at 180a and 180b. When the marks 179a and 180a, 180b are opposite one another, roller #1 or rotor #1 is in its zenith position at the zero line and worm 84 is in its zero position as shown in FIG. 6.

When the transmission is assembled thusly, all of the rotary elements 126 can be equipped with their full compliments of rollers 144 for engagement with all of the races 172 as well as with the threads of the worm gear 84. It should be noted that the holes 178 are all located at the very bottoms of the races 172 so that they do not interfere with the movements of drive rollers 144, all of which roll along the side walls of their respective races 172. In effect, then, the assembly method described herein involves the effective attachment of gear teeth to a gear transmission after assembly of the transmission.

The coaxiality, extreme compactness, high efficiency and shock absorbing capability of transmission 30 enables the integration of the transmission with the induction motor 32 whose speed change may be effected by thyristor circuits working in concert to control the motor speed by frequency modulation. Most conventional induction motors of this type are capable of running at speeds as high as 12,000 rpm, which are far beyond the capability of classically wound DC motors. By using an induction motor with a thyristor control one may build an integrated toroidal drive system which can convey very high horse power and torque to machine elements such as automotive wheels, positioning devices for radar antennas and the like, rotor shafts for helicopters, and power joints for earth moving equipment and the like.

Figure 7:
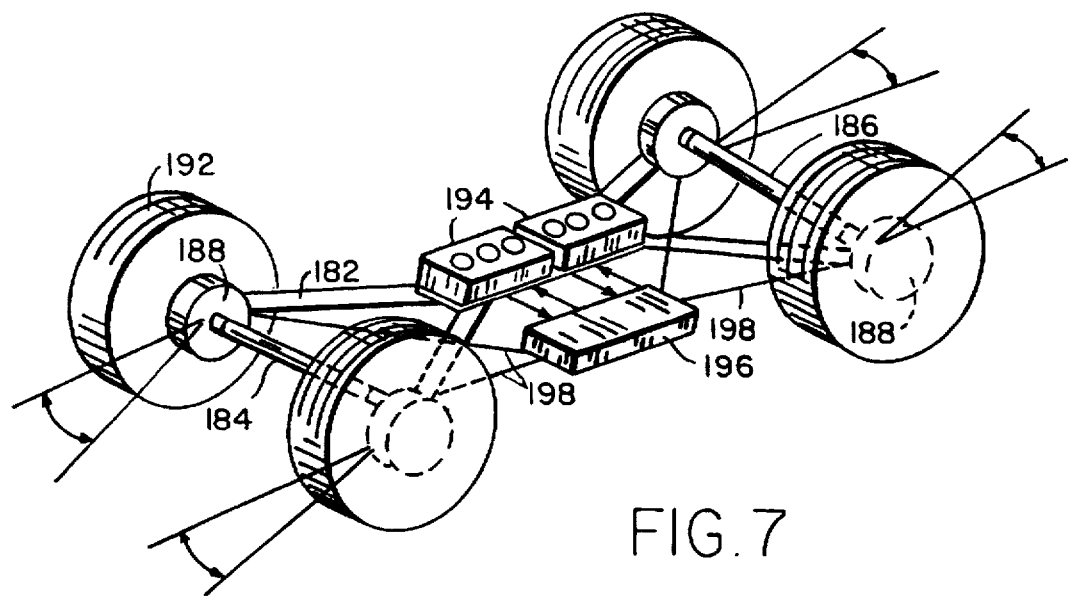
FIG. 7 is a diagrammatic view illustrating the FIG. 2 drive system being used to power the individual wheels of a motor vehicle.

FIG. 7 illustrates diagrammatically an automotive or mobile platform comprising a frame 182 having front and rear axles 184 and 186. Mounted to the opposite ends of axles 184 and 186 are individual motorized toroidal drives 188 of the type shown in FIG. 2. The motor housings 34 (FIG. 2) of the drives 188 are connected to the axles 184, 186 and the output shafts 102 of the drives 188 are coupled to the hubs of wheels 192. The motors 32 of the drives 188 may be powered by batteries 194 supported by frame 182 and whose outputs are coupled to the drives by way of a control circuit 196.

Four such drives 186 each being about 8 inches in diameter should be able to rotate wheels 192 at a very high speed e.g., 400 rpm, applying about 400 horsepower at each wheel. At that average speed, the associated electrical motors 32 would run at about 7200 rpm. Thus, due to the compactness, efficiency and robustness of the present drive system, it is now possible to provide a direct drive for each wheel of an on-road or off-road vehicle.

With my toroidal drive, one can not only power each wheel 192 of the vehicle, but also control electronically the angular velocity of each wheel when turning a corner so that the radially outer wheels of the vehicle run faster than the radially inner wheels. Thus, the mechanical differential used on conventional automobiles may be replaced by an electrical circuit that controls motor speed in relation to the turning radius at the curve or corner, thus eliminating numerous mechanical parts which are also cause significant acoustic noise. Also, the ground clearance of the vehicle incorporating my toroidal drives may be increased significantly because of the absence of the differential gear box present on conventional automotive vehicles.

The elimination of differentials, universal shafts, heavy and complicated mechanical gear transmissions and such space-consuming structures thus opens the possibility of making a vehicle all of whose wheels are steerable using electromechanical means incorporating my drive which should drastically reduce the turning radius of the vehicle. From a practical standpoint, then, the parking of the vehicle in a narrow space becomes vastly easier than for current vehicles which do not control each wheel with a toroidal drive according to this invention.

Another advantage stemming directly from my torodial drive is the ability to eliminate the brakes from the vehicle and use the electrical motors 32 of the drives 188 regeneratively to feed electrical current back into the batteries 194 via circuit 196 when the vehicle is going downhill. In other words, when the vehicle goes downhill and the driver steps on the "brake", the brake may actuate switches in circuit 196 causing the drive motors 32 to become electrical generators so that they act as efficient non-slip brakes. This feature significantly increases the range of the vehicle. It should be emphasized in this connection that most high reduction mechanical transmissions employing worm gears and the like are not reversible and cannot be used in regenerative braking systems because they simply lock up. This is not the case with the present toroidal drives 188 because they are fully reversible. This feature may translate into a fuel saving for the vehicle in the order of 25%.

Another advantage of the FIG. 7 vehicle incorporating toroidal drives 188, which also effects the range of the vehicle, is the ability, on horizontal stretches of road, to only move the vehicle with one or two drives 188 while the remaining drives are shut off by circuit 196. Yet, when sudden acceleration is required, all four drives 188 may be activated thereby enhancing the acceleration of the vehicle. Yet, while the vehicle has the operational advantages described, the elimination of all of the wheel brakes, as well as the differential gears and gear transmission, reduces considerably the overall cost of the vehicle.

Further, if for any reason one of the drives 188 becomes inoperative, one merely has to remove the effected wheel 198 and its coupled drive 188 and replace it with a spare wheel which already incorporates an operable toroidal drive.

In summary, then, with my toroidal drive, one may reduce a standard automobile mechanical power transmission in weight and size by approximately ten times while achieving a gear ratio that enables the transmission to be used along with an integral inverter-type electrical motor to power. This enables the vehicle to operate over a vastly increased range, achieve greater maneuverability, obtain an all-wheel steering capability and still eliminate complex mechanisms such as gear boxes, differentials, universal shafts brakes and the like which make conventional automotive vehicles so expensive.

Figure 8:
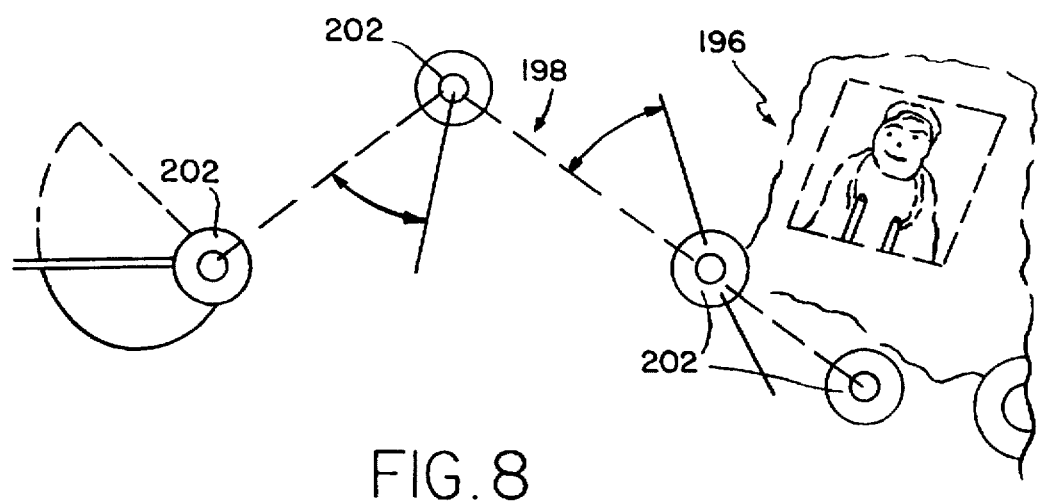
FIG. 8 is a similar view showing the FIG. 2 drive system being used to drive various rotary joints of a front end loader.

FIG. 8 illustrates diagrammatically a front end loader 196 having an articulated working arm 198 which incorporates a plurality of power joints 202 each of which comprises a toroidal drive of the type illustrated in FIG. 2. Due to the toroidal drive's relatively low gear reduction ratio and high torque handling capability, the power joints 202 can be used in lieu of the pneumatic or hydraulic pistons customarily employed to articulate the working arms of present day off road vehicles of this general type.

Figure 9:
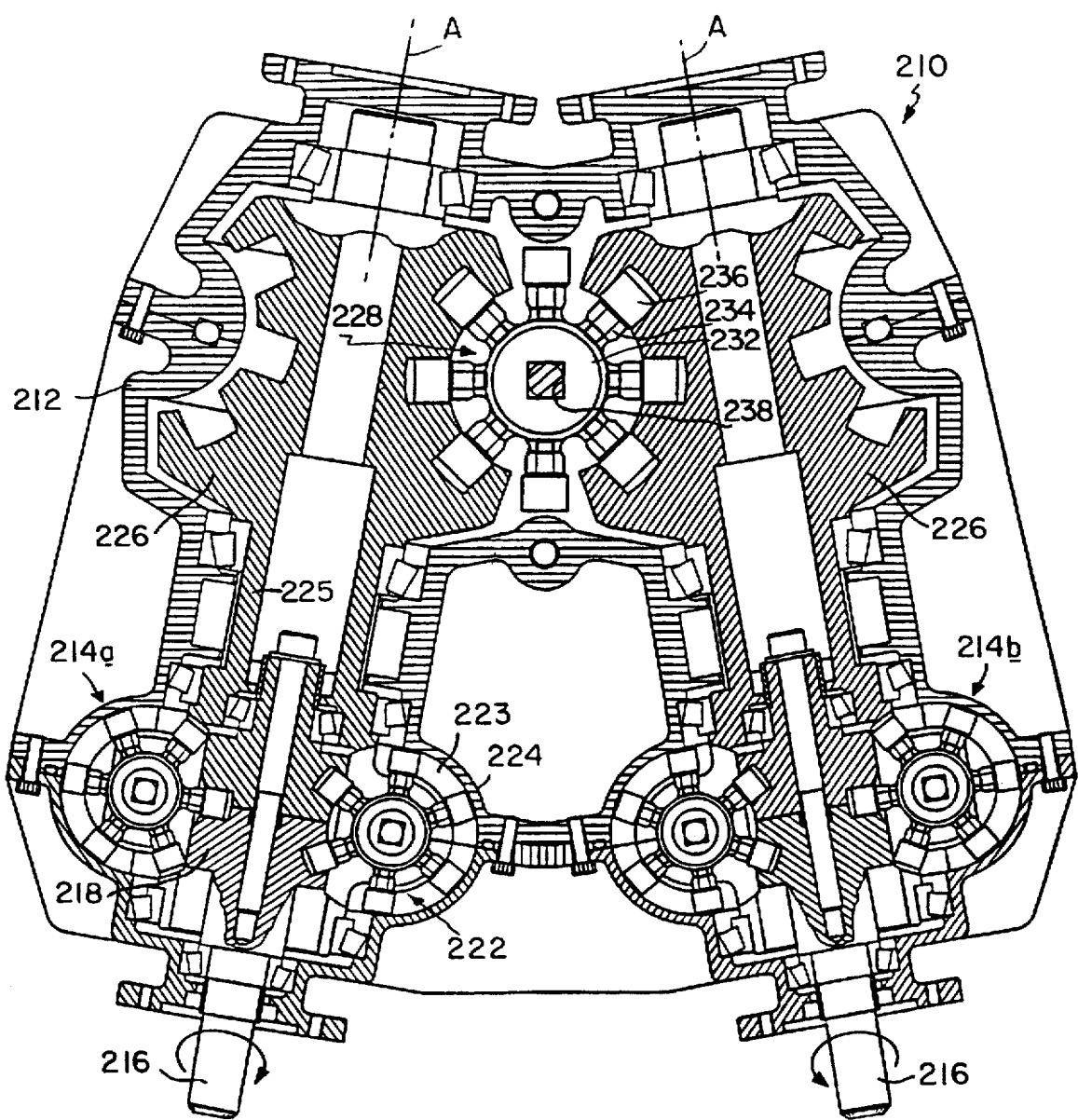
FIG. 9 is a sectional view of a helicopter drive assembly incorporating a pair of my toroidal drive transmissions.

Refer now to FIG. 9 which shows a helicopter transmission employing two of my toroidal drives which cooperate to drive a common main rotor element or star wheel that drives the main rotor shaft of the helicopter. The helicopter transmission shown generally at 210 has a housing 212 which encloses a pair of substantially identical toroidal transmissions shown generally at 214a and 214b, which transmissions are essentially the same as the one depicted in FIG. 3. Each transmission includes an input shaft 216 which may be coupled to the output shaft of a conventional jet turbine engine so that the shaft 216 is rotated in the direction indicated by the arrow, i.e., the two shafts are rotated in opposite directions.

Each input shaft 216 rotates a central worm 218 which meshes with the drive rollers of a plurality of rotor elements 222 whose teeth also engage in the toroidal guide races or grooves 223 inscribed in a stator housing 224 section of housing 212. The rotary elements 222 are mounted at spaced-apart locations around a tubular output shaft 225 so that rotation of the rotors 222 about their respective axles causes rotation of the output shaft 225 as described above.

In this case, however, the free end of the output shaft 225 is terminated by a large worm 226 which is rotatably mounted within the transmission housing 212. As shown in FIG. 9, the longitudinal axes A of the two toroidal drives 214a and 214b are inclined toward one another so that their respective worms 226, 226 can engage opposite sides of a large star wheel shown generally at 228 rotatably mounted in housing 212. The illustrated star wheel has a hub 232 with eight fingers 234 extending out radially from the hub with each finger being terminated by a drive roller 236 arranged to engage the threads of the two worm 226. The hub 232 of the star wheel 220 is mounted to the lower end of a rotor shaft 238 which may rotate a set of standard helicopter rotor blades (not shown).

When the two input shafts 216 of the transmission 210 are counterrotated as shown at a speed in the order of 33,600 rpm, the two output shafts 225 and worms 226 of the two toroidal drives 214a and 214b are rotated about 14,000 rpm. This causes the star wheel 228 and the rotor shaft 238 connected thereto to rotate at a speed of about 350 rpm. This tandem toroidal drive arrangement provides a very effective way to develop the necessary high rotation torque to drive a set of helicopter blades at the necessary relative low speed.

Instead of milling the housing sections 52a and 52b to form the stator grooves or races 172 as described above in connection with FIGS. 2 to 4, the required compendium of stator races may be formed piecemeal. More particularly, FIG. 10 depicts a stator housing section shown generally at 242 composed of a multiplicity of substantially identical stator segments 244. As shown in FIG. 10A, each segment 244 comprises a main body sector 246 having a rounded outer wall 246a and an arcuate inner rib 248 which is inset to provide a pair of shoulders 252a and 252b on opposite sides of the rib. The segments 244 are arranged side by side in a circle as shown in FIG. 10 so that the shoulders 252a, 252b of adjacent segments 244 lie adjacent to one another and form a set of parallel toroidal races 254. The circular array of stator segments 244 is maintained by an outer ring 256 which may actually constitute part of the transmission housing. The segments 244 may be fastened to the ring and to each other by spot welds or brazing 257 or by other fastening means such as threaded fasteners extending through the ring.

To facilitate assembling the stator segments 244, the stator segments may be arranged around a fixture 258 having an upper flange 258a which is notched at its periphery to provide teeth 262 arranged to engage the upper ends of the shoulders 252a and 252b of the adjacent stator segments 244. Extending down from the inner diameter of flange 258a is a cylindrical portion 258b whose lower end is notched to provide teeth 264 arranged to engage the lower ends of the shoulders 252a and 252b of the adjacent stator segments 244.

After the stator segments are all arranged around the fixture 258 as shown in phantom in FIG. 10, the outer ring 256 may be engaged around the segments from below. If desired, this may be done while ring 256 is hot, so that when the ring cools, it shrinks so as to tightly surround, and clamp together, all the stator segments 244.

As a direct result of its small size and high torque carrying capability and wide range of gear reduction ratios, my transmission can be used in many other applications such as to rotate radar antennas, boat propellers, etc. Also, while the illustrated drive incorporates an electric motor 32, it should also be understood that the transmission 30 may be powered by other motive sources such as steam turbines, water wheels, jet engines, etc.

It will thus be seen that the objects set forth above, among those made apparent from the preceding description, are efficiently attained. Also, certain changes may be made in carrying out the above method and in the constructions set forth without departing from the scope of the invention. For example, the entire toroidal drive 30 may be internally lubricated using conventional means. Also, when producing small transmissions, the rotor elements 126 may be made more inexpensively using particularly shaped non-rotating fingers that engage in the stator grooves. These fingers, one of which is shown at 142' in FIG. 2 are, in cross section basically, rounded squares which enable the build-up of an oil wedge when the rotors revolve. This shape allows the fingers to "aqua-plane" along the stator groove walls with minimum friction. Such rotor elements may be cast or forged to the correct shape with surface properties that are particularly suitable for the lubricant to achieve optimum performance. Therefore, it is intended that all matter contained in the above description or shown in the accompanying drawings shall be interpreted as illustrative and not in a limiting sense.

It is also to be understood that the following claims are intended to cover all of the generic and specific features of the invention described herein.

What is claimed is:

1. A toroidal drive system comprising a housing composed of first and second mating housing sections having interior walls which cooperate to define a plurality of parallel, helix-like races inscribed in a torus having a circular axis;

securing means for securing together the two mating housing sections;

a plurality of rotary elements fixedly spaced apart along said axis, said elements each having an axle fixed at said axis and a plurality of removable, radially extending teeth rotatably encircling the corresponding axle, each tooth of each rotary element engaging in a different one of said plurality of races;

a worm mounted for rotation in said housing about a second axis substantially perpendicular to the circular axis, said worm engaging at least one tooth of each of said plurality of rotary elements;

power take off means connected to all of said axles and extending without said housing, and means defining a hole through a housing section wall at the bottom of each race, said hole being larger than the teeth engaged in that race so that the housing sections can be mated around the rotary elements while said elements are missing some teeth and secured together by the securing means after which the missing teeth may be installed on the rotary elements through said holes by rotating the worm to align the missing tooth positions of the elements with said holes.

2. The drive system defined in claim 1 wherein said housing section walls define at least four helical races and each rotary element has at least four teeth.

3. The drive system defined in claim 2 wherein said drive system has at least four rotary elements.

4. The drive system defined in claim 1 wherein there are four rotary elements in the housing.

5. The drive system defined in claim 1 and further including alignment means for setting the phase angles of the worm and power take off means about the second axis to facilitate assembly at the drive system.

6. The drive system defined in claim 1 wherein said teeth comprise bearings.

7. The drive system defined in claim 6 wherein each of said bearings constitutes an internally lubricated sleeve bearing.

8. The drive system defined in claim 6 wherein each of said bearings is a needle bearing.

9. A toroidal drive system comprising a housing having a wall defining a plurality of parallel, helix-like races inscribed in a torus having a circular axis;

a plurality of axles fixedly spaced apart in said housing along said circular axis;

a corresponding plurality of rotary elements rotatably mounted to said axles in said housing, said elements having removable and replaceable teeth, each tooth of each element being in engagement with a different one of said races;

a rotary input shaft extending into the housing at a point of entry and perpendicular to said circular axis and having a worm gear centered between said rotary elements and meshing with the adjacent teeth of said elements;

a rotary output shaft extending into said housing collinear to said input shaft;

connecting means in said housing for connecting said axles to said output shaft, and means defining holes in said housing wall at the bottoms of at least some of said races, said holes being larger than said gear teeth so as to permit the placement of said teeth on said rotary elements from outside the housing.

10. The drive system defined in claim 9 wherein the connecting means comprise a radial enlargement on the end of the output shaft inside the housing;

said axles are fixed at spaced-apart locations around the enlargement; and the input shaft is rotatably mounted within the enlargement.

11. The drive system defined in claim 10 wherein the enlargement extends past said wall and said worm gear substantially to the point of entry of the input shaft into the housing.

12. The drive system defined in claim 9 wherein each rotary element comprises a ring rotatably encircling a hub;

a plurality of fingers extending radially from the ring each finger having a tip;

roller means positioned at each finger tip and constituting a rotary element tooth engaging said worm gear and one of said races, and fastening means rotatably mounting each roller means to the corresponding finger tip.

13. The drive system defined in claim 12 wherein each of said roller means include a needle bearing.

14. The drive system defined in claim 12 wherein each said roller means include an internally lubricated sleeve bearing.

15. The drive system defined in claim 9 wherein said holes are present at the bottoms of said plurality of races.

16. The drive system defined in claim 9 and further including motive means including a stationary part mounted to said housing and a coacting rotary part rotatably coupled to said input shaft to impart torque to the output shaft.

17. The drive system defined in claim 16 wherein the motive means is an electric induction motor.

18. The drive system defined in claim 17 and further including control means for controlling the current to the induction motor to vary the rotational speed of said output shaft.

19. The drive system defined in claim 16 wherein the motive means is a turbine.

20. A toroidal drive system comprising an integrated shaft assembly including a relatively low torque input shaft having a worm, a relatively high torque tubular output shaft rotatably receiving said worm and a major portion of said input shaft, said input and output shafts having a common shaft axis, a circular array of radial slits in said output shaft opposite the worm, a corresponding circular array of rotors rotatably mounted to said output shaft along a common circular axis that is concentric to and perpendicular to said shaft axis, each rotor having a plurality of radial fingers some of which extend toward said shaft axis and engage said worm and others of which extend away from said shaft axis and protrude from the output shaft, and a housing having opposite ends and surrounding said shaft assembly, said housing including support means for supporting the shaft assembly for rotation about the shaft axis, and a plurality of guide grooves in a wall of the housing that surrounds said rotors, said guide grooves being engaged by said protruding fingers of the rotors so that when the rotors are rotated about said circular axis, they cause precession of the shaft assembly about the shaft axis.

21. The drive assembly defined in claim 20 wherein the finger of each rotor is terminated by a rolling tip which is adapted to roll along the guide grooves and the worm.

22. The drive system defined in claim 21 wherein each rolling tip comprises a drive roller and securing means for removably securing the drive roller to the corresponding finger.

23. The drive system defined in claim 22 and further including access holes in said housing opening into said guide grooves so that said drive rollers can be attached to and removed from the corresponding fingers from outside the housing.

24. The drive system defined in claim 20 wherein each rotor is positioned along said circular axis so that the rotor conforms to a pitch angle in which the worm radial position coincides with a guide groove location that engages diametrically opposite fingers of the roller with both the worm and a guide groove so that successive rotors of the rotor array are spaced apart along said circular axis by progressively smaller amounts.

25. The drive system defined in claim 20 wherein the support means include first and second bearing units at said opposite ends of the housing and which support the output shaft for rotation about said shaft axis within the housing, while the input shaft and worm are free to rotate about said shaft axis within the output shaft.

26. A power joint for lifting apparatus and the like comprising a toroidal drive system as defined in claim 1 or 20, a first rigid arm connected to the drive system housing, second rigid arm connected to one of the drive system shafts, and motor means for rotating the other of the drive system shafts.

27. A power drive for propelling a vehicle comprising a frame including an axle;

a wheel having a hub;

a toroidal drive system as defined in claim 1 or 20;

means for mounting the drive system housing to an end of said axle;

means for coupling said hub to the drive system output shaft, and motor means for rotating the drive system input shaft.

28. A toroidal drive system as defined in claim 1 or 20 and further including a worm gear mounted to said output shaft exteriorally of the housing;

a toothed rotary member;

mounting means for mounting the rotary member opposite the worm gear for rotation about an axis that is perpendicular to the shaft axis with the teeth of the rotary member engaging the threads of the worm gear, and torque take off means connected to said rotary member for coupling torque to a load.

29. A toroidal drive system as defined in claim 1 or 20 and further including a second similar drive system;

a separate worm gear coupled to the output shaft of each of said drive systems;

mounting means for mounting said toroidal drive systems so that their respective worm gears extend adjacent to one another;

a toothed rotary member rotatably mounted to said mounting means between said worm gears so that different teeth of the rotary member engage said worm gears, and torque take off means connected to said rotary member for coupling torque to a load.

30. The drive system defined in claim 29 wherein the torque take off means comprise a rotor or propeller shaft.

31. The drive system defined in claim 30 and further including means for counterrotating the input shafts of said drive systems.

32. A motorized toroidal drive system comprising an electric motor having a stator and a rotary shaft extending from the stator;

a worm formed on the shaft exterially of the stator;

a tubular output shaft having a segment thereof encircling the worm;

a circular array of radial slits in the output shaft opposite the worm;

a comparable array of radially extending rotors rotatably mounted to said output shaft in said slits, each rotor having a plurality of radial fingers some of which extend toward and engage said worm and others of which extend away from the worm and protrude from the output shaft, and a housing surrounding said motor, said housing having a plurality of interior torus-like guide grooves engaged by said protruding rotor fingers, thereby providing a large speed reduction with a single integral coaxial shaft assembly so that the drive system is capable of generating high torque with a relatively small electric motor due to the high reduction ratio of the drive system.

33. A method of assembling a toroidal drive system comprising forming an input shaft with a worm;

forming a tubular output shaft with a circular array of radial slits;

rotatably mounting the worm and a major length of the input shaft inside the output shaft to form a collinear shaft assembly;

rotatably mounting rotary elements to said output shaft in said slits, each element being adapted to support a plurality of removable teeth at selected tooth positions;

forming a housing composed of first and second mating housing sections having interior walls which cooperate to define a plurality of parallel, helix-like races inscribed in a torus having a circular axis;

forming access holes in the walls of said housing sections which holes intercept said races;

with the two housing sections apart and with only the teeth of the rotary elements that face the worm supported on the rotary elements, inserting the shaft assembly into one of the housing sections;

mating the other housing section to the one housing section so that said two sections completely surround the rotary elements, and rotating the worm to rotatably position the rotary elements along the races so that said tooth positions are disposed opposite the access holes enabling the missing teeth to be attached to the rotary elements from outside the housing after the two housing sections are mated.

34. The method defined in claim 33 including the additional step of forming each rotary element tooth as a finger with a roller removably and rotatably secured to the fingertip.

35. The method defined in claim 34 including the step of forming each roller as a needle or sleeve bearing.

36. A stator assembly for a toroidal drive system comprising a plurality of substantially similar wedge-shaped stator segments, each segment having a curved surface and a raised curved rib in the center of said surface which is narrower than said surface so as to define first and second shoulders on opposite sides of the rib, said segments being shaped so that when positioned side by side, they form a torus with an inside diameter and an outside diameter and the first and second shoulders of adjacent segments combine to define helical guide grooves between the ribs of adjacent segments which extend between the inner and outer diameters of the torus, and securing means for maintaining said segments in position side by side.

37. The stator assembly defined in claim 36 wherein said securing means comprise a ring which tightly encircles said segments.

38. The stator assembly defined in claim 37 and further including connecting means for connecting said ring to said segments.

39. A method of assembling a stator assembly for a toroidal drive comprising the steps of forming a plurality of substantially similar wedge-shaped stator segments, each segment having a curved surface and a raised curved rib in the center of said surface which is narrower than said surface so as to define first and second shoulders on opposite sides of the rib, said segments being shaped so that when positioned side by side, they form a torus with an inside diameter and an outside diameter and the first and second shoulders of adjacent segments combine to define helical guide grooves between the ribs of the adjacent segments which extend between the inner and outer diameters of the torus;

positioning said segments around a flanged, cylindrical fixture whose cylindrical edge and flange edge are notched to receive the ribs of said segments at the inner and outer diameters of the torus so as to position the segment in side by side relationship;

engaging a ring around the segments to maintain the segments in side by side relationship, and removing the fixture from the segments.

* * * * *